United States Patent [19]

Jones et al.

[11] Patent Number: 4,634,267
[45] Date of Patent: Jan. 6, 1987

[54] PHOTOCOPIER SCANNING APPARATUS AND METHOD FOR ADJUSTMENT

[75] Inventors: Rick O. Jones; Walter F. Price, Jr., both of Longmont; Glenn E. Siemer; Michael H. Ulrich, both of Boulder, all of Colo.

[73] Assignee: International Business Machines Corporation, Armonk, N.Y.

[21] Appl. No.: 701,490

[22] Filed: Feb. 14, 1985

[51] Int. Cl.$^4$ ............................................. G03B 27/70
[52] U.S. Cl. ........................................ 355/66; 355/8; 355/11; 355/55
[58] Field of Search ........................ 355/8, 11, 66, 55

[56] References Cited

U.S. PATENT DOCUMENTS

| | | | |
|---|---|---|---|
| 3,062,108 | 11/1962 | Mayo | 355/11 |
| 3,752,558 | 8/1973 | Lloyd | 350/6 |
| 3,867,026 | 2/1975 | Ogawa | 355/8 |
| 3,884,574 | 5/1975 | Doi et al. | 355/66 |
| 4,023,897 | 5/1977 | Clark | 355/8 |
| 4,155,641 | 5/1979 | Sagara et al. | 355/8 |
| 4,355,883 | 10/1982 | Landa | 355/8 |
| 4,371,254 | 2/1983 | Beery | 355/8 |
| 4,436,416 | 3/1984 | Negoro et al. | 355/11 |

Primary Examiner—Monroe H. Hayes
Attorney, Agent, or Firm—B. A. McDowell; M. H. Klitzman; C. E. Rohrer

[57] ABSTRACT

An improved drive for a scanning optical system in a photocopier is disclosed. The drive incorporates an adjustable capstan and precision tapes as well as cables. The precision tapes are used between the two carriages which mount the optics because precise control of length in this portion of the system is critical. Cables are used in the remainder of the drive where flexibility in all directions is important. There is also a single drive embodiment. Also disclosed is a method for proper alignment of the carriages after field replacement of a broken cable.

2 Claims, 6 Drawing Figures

PHOTOCOPIER SCANNING APPARATUS AND METHOD FOR ADJUSTMENT

BACKGROUND OF THE INVENTION

This invention relates to a drive for a scanning optical system in a copying apparatus. More specifically it relates to an apparatus and method for establishing correct carriage position upon cable replacement.

In the prior art, scanning apparatus for electrophotographic copiers usually includes a full-rate carriage and a half-rate carriage. The full-rate carriage mounts a lamp and a mirror and moves along the length of a document illuminating successive portions of its surface. The half-rate carriage mounts two mirrors and moves in the same direction as the full-rate carriage, but at one half its speed. Light from the document is reflected by the full-rate mirror to the half-rate mirrors and thence to a lens. The lens focuses the light upon the photoconductive drum. The motion of the half-rate carriage relative to the full-rate carriage maintains a constant object distance from the illuminated portion of the document to the lens so that the image on the photoconductive drum is always in focus.

The two carriages are mounted on two parallel guides and are driven by a single-cable or dual-cable arrangement. In a dual-cable system, both ends of the carriages are driven. Each cable is attached to the full-rate carriage and engages a running block pulley mounted on the half-rate carriage.

For correct operation of the copying apparatus the two carriages must be parallel to each other and perpendicular to the direction of scan. Furthermore, the distance between the two carriages at any point in the scan must be repeatable from scan to scan. These parameters are set originally at the factory using sophisticated optical equipment. However, after field replacement of a broken cable the customer engineer must restore proper alignment of the optics. Up to now he has relied on precision cables and an iterative process. He replaces the cable, makes a copy and adjusts the cable at its fixed ends to compensate for an out-of-focus condition. He then makes another copy and continues the process until focus has been achieved.

It must be remembered that the customer engineer is adjusting not only the total cable length, but the ratio of that portion of the cable between the two carriages to (a) the total length, and (b) the length of cable running from the full-rate carriage to ground. He is adjusting two ratios and a total length and an adjustment of any of these three affects the other two. In a dual-cable system the problem is worse and possible combinations become staggering.

This process is extremely time consuming since the customer engineer must turn off the machine and open it up to make the adjustments and then must reclose it, turn it on and wait for it to warm up before he can make the copy. Occasionally, he is unable to readjust the focus and the carriage subassembly must be returned to the factory where it can be placed on an optical bench for readjustment of the focus. Also, the precision cables are very costly to produce. Although cutting the cables to a precise length is not difficult, the tight tolerance cannot be maintained for the process of adding the attachments at the ends of the cables.

SUMMARY OF THE INVENTION

Accordingly, the principal object of the present invention is to allow the direct replacement of broken drive components in a scanning optics drive system without complicated adjustments or sophisticated tools.

A further object of the invention is to reduce the cost of replacement cables since they need not be precision cables.

In accordance with these and other objects of the invention, the scanning optics drive in a dual drive system includes an adjustable capstan, cables and precision tapes. The precision tapes are used between the two carriages which mount the optics, because precise control of length in this portion of the system is critical. Cables are used in the remainder of the drive where flexibility in all directions is important. The cables are coiled about capstans. One of these capstans is adjustable relative to the other capstan. There is also a single drive embodiment.

After field replacement of a broken cable, a simple rotational adjustment of one capstan relative to the other brings the two carriages into proper alignment.

DESCRIPTION OF THE PREFERRED EMBODIMENTS

Figure 1:
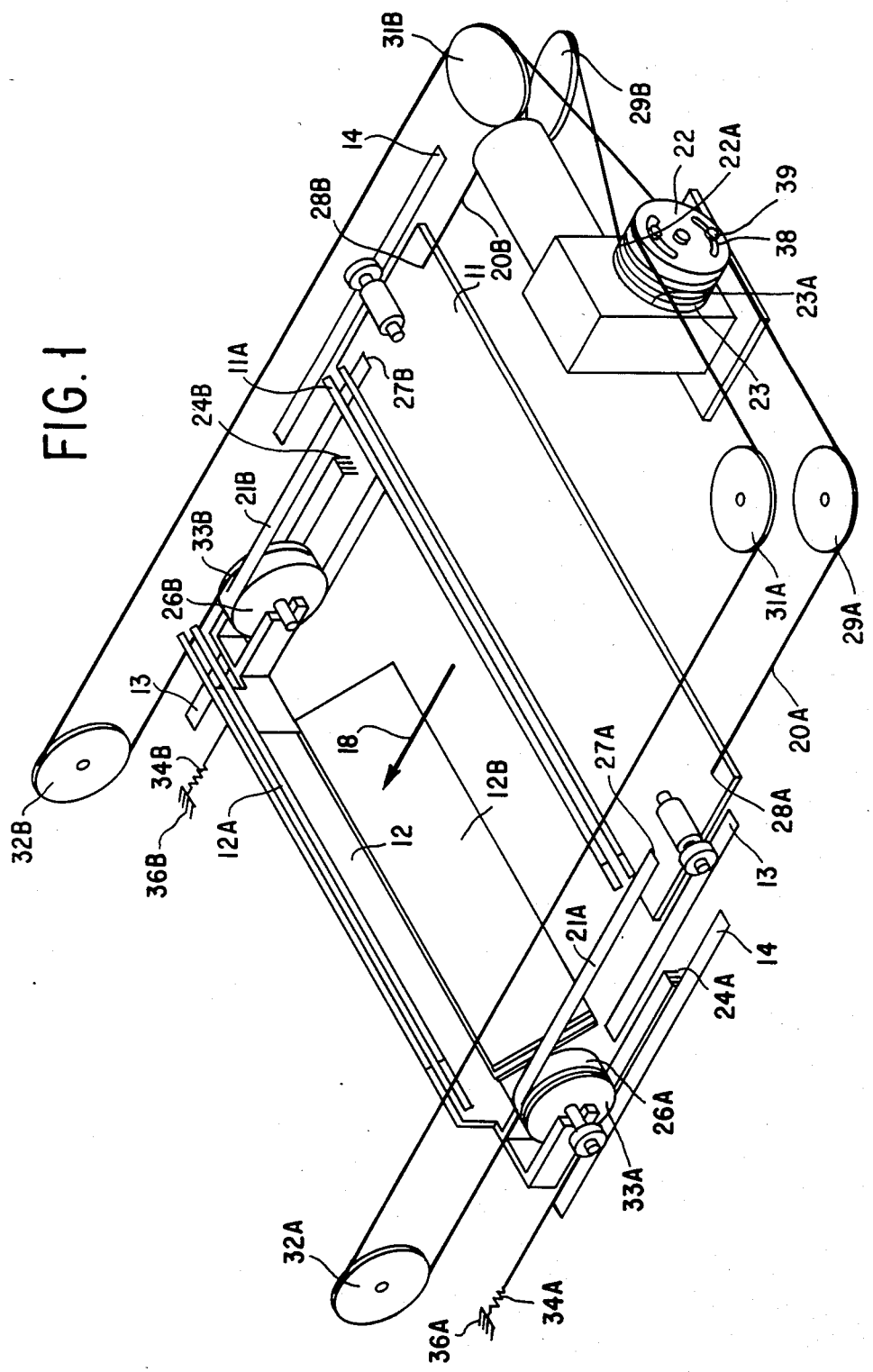
FIG. 1 is an isometric view of a photocopier scanning mechanism illustrating one embodiment of the invention.
Figure 2:
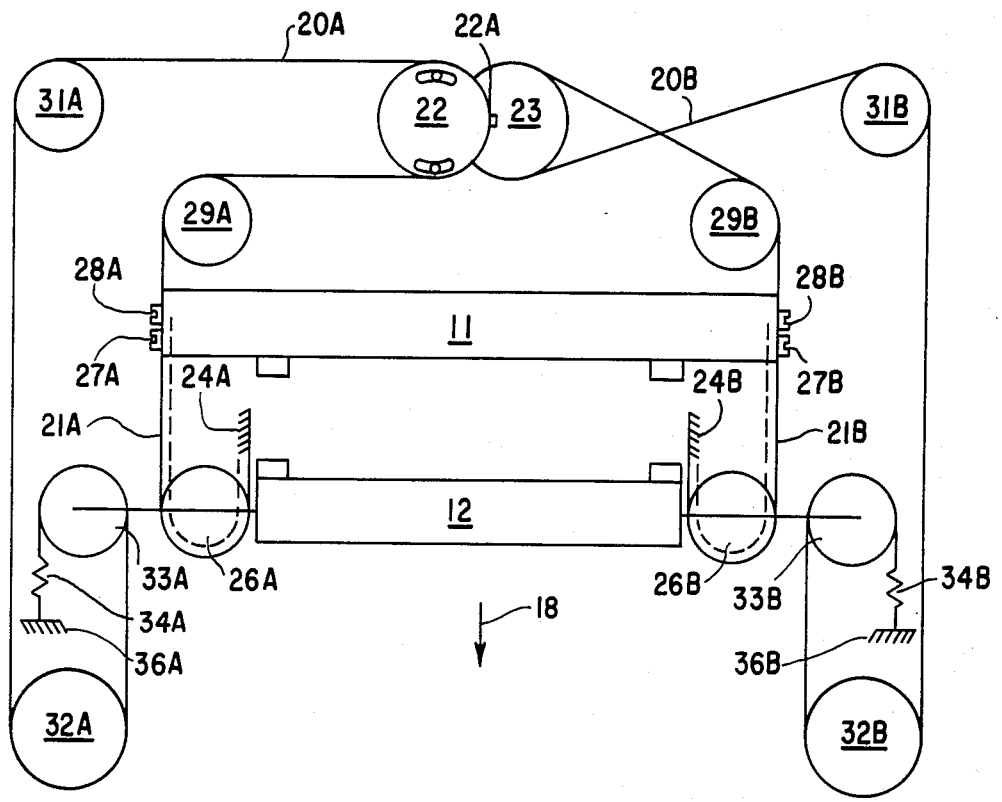
FIG. 2 is a plan view of FIG. 1
Figure 3A:
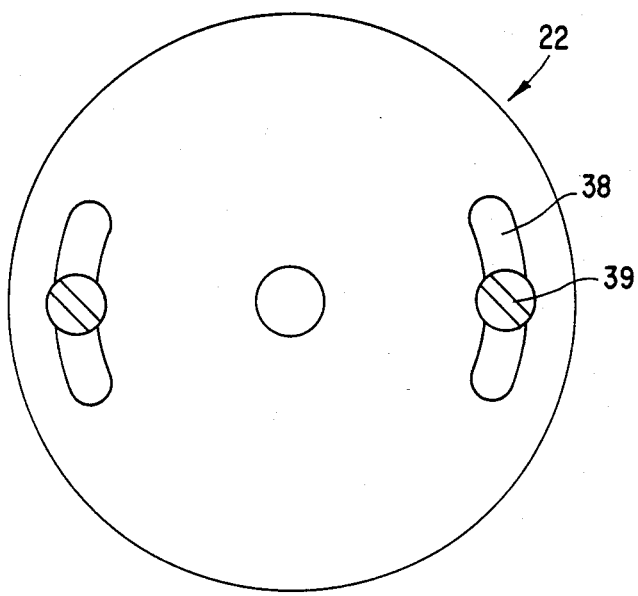
FIGS. 3a and 3b are enlarged view of the capstans.
Figure 3B:
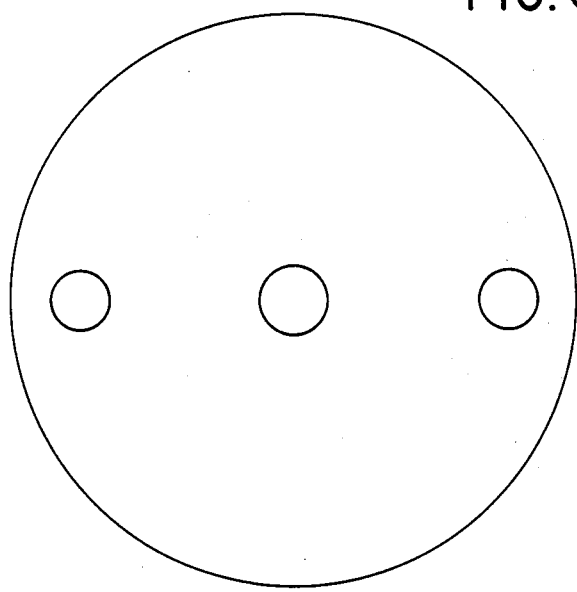

Referring now to FIGS. 1-3 of the drawings there is shown by way of example a dual-cable scanning apparatus incorporating the improved drive of the present invention. Full-rate carriage 11 and half-rate carriage 12 are mounted upon parallel slides 13 and 14. The document to be copied is placed upon a transparent glass plate. The image of the document is projected by means of full-rate mirror 11a mounted on full-rate carriage 11. Full-rate carriage 11 also carries the illuminating lamp and its reflector.

Full-rate mirror 11a scans the entire length of the document in the direction indicated by arrow 18. At the same time, half-rate mirrors 12a and 12b mounted on half-rate carriage 12 move in the same direction at one half the rate of the full-rate mirror to maintain the object to lens optical path length constant throughout the scan distance. The movement of carriages 11 and 12 presents a flowing image of the document to the photoconductor drum.

In order to produce clear copies, at least three conditions relating to the scan must occur. First, full-rate carriage 11 must move in the direction of scan 18 and illuminate the document with a straight footprint of light which is perpendicular to direction of scan. Second, carriages 11 and 12 must be parallel. Finally, the distance between carriages 11 and 12 at any given point in the scan must repeat from scan to scan so that the object to lens optical path length will be constant throughout the scan. These parameters are originally set at the factory by placing the carriage subassembly on the optical bench and adjusting the drive until focus is achieved. However, after cable replacement in the field, proper alignment of the optics must be restored without access to an optical bench.

Referring again to FIGS. 1-3, the improved drive of the present invention as embodied in a dual drive scanning apparatus includes cables 20a and 20b, precision tapes 21a and 21b, and capstans 22 and 23. Cable length cannot be controlled to the same tolerance achievable for the precision tapes. This is a result of the way in which the two items are manufactured. Cable manufacture is a two-step process. The cable is first cut to length which can be done quite precisely. This excellent tolerance is lost when the attachment eyelets are crimped onto the ends of the cable. Precision tape manufacture, on the other hand, is a one-step process. Attachment holes are punched into the tape on the same tool and the same time that the tape is cut to length. Thus, the length of the working portion of the tape (from attachment to attachment) can be controlled to a tolerance of ±0.001."

Precision tapes and cables are combined in the drive system in such a way that their advantages are maximized whereas their disadvantages are minimized. Precision tapes have tightly controlled length tolerance, but flexibility in one direction only. Accordingly, they are used in the portion of the drive where precise control of length is critical. Due to this precision, these tapes are interchangeable from one machine to another, or directly replaceable in the field without need for adjustment. Since each tape engages only one pulley the lack of flexibility has minor impact. Cables are used in those portions of the drive where a succession of pulleys at different angles are engaged and flexibility in all directions is essential. The control of length is less critical in this portion of the system than in the portion where the precision tapes are used.

Precision tapes 21a and 21b are fixed to the carriage subassembly by means of factory adjustable mounts at points 24a and 24b. Then they engage running block pulleys 26a and 26b at either end of half-rate carriage 12 and attach to full-rate carriage 11 at points 27a and 27b. Sophisticated optical equipment in the factory is used to position these mounts at 24a and 24b such that when the tapes are tensioned, the correct optical length is set when the carriages are parallel. Once properly positioned, these initial adjustments need never be disturbed for tape or cable replacement. Cables 20a and 20b are also attached to full-rate carriage 11 at points 28a and 28b. They then pass a quarter of the way around idler pulleys 29a and 29b and are coiled around capstans 22 and 23. Capstan 22 is designed for rotational adjustment via slots 38 and screws 39. In order to prevent any slippage between cables 20a and 20b and capstans 22 and 23, cables 20a and 20b are fixed to the capstans at points 22a and 23a, respectively. The cables 20a and 20b then successively traverse a quarter of the way around idler pulleys 31a and 31b, half-way around idler pulleys 32a and 32b and engage running block pulleys 33a and 33b at the ends of half-rate carriage 12 before attaching by means of springs 34a and 34b to the carriage subassembly at points 36a and 36b.

After field replacement of a broken cable or cables, if cable 20a and cable 20b are not of equal length, the two carriages 11 and 12 will not be parallel. Full-rate carriage 11 can be made parallel to half-rate carriage 12 by a simple rotational adjustment of capstan 22 relative to capstan 23. This is done by loosening screws 39 in slots 38 so that capstan 22 is free to rotate about its center axis (See FIG. 3.) The capstan is then rotated until parallelism is achieved. Due to the precision lengths of the tapes and the initial factory adjustment of their mounts, the correct optical path length is reestablished by achieving parallelism of the carriages. At the point of parallelism screws 39 are tightened so that capstan 22 is locked in position. If cable 20a is longer than cable 20b the rotation of capstan 22 will be clockwise. If cable 20a is shorter than cable 20b the rotation of capstan 22 will be counterclockwise. Springs 34a and 34b take up any excess length in the remaining portions of cables 20a and 20b.

Figure 5:
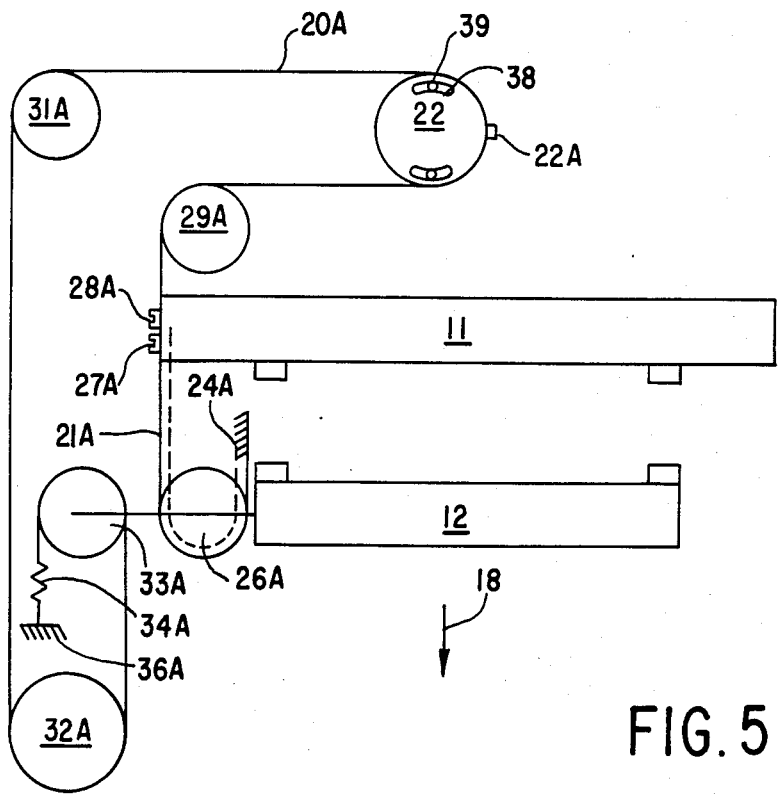
FIG. 5 is a plan view of FIG. 4.
Figure 4:
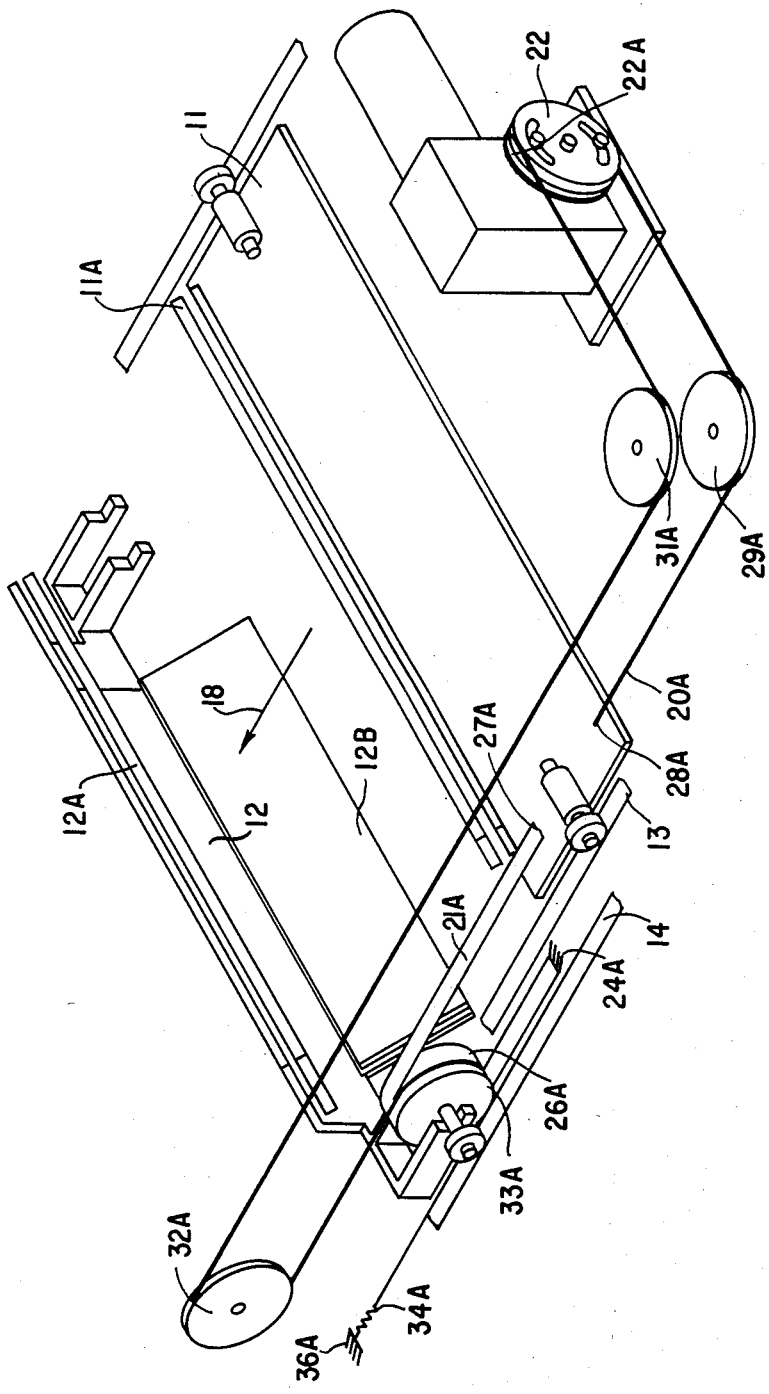
FIG. 4 is an isometric view of a photocopier scanning mechanism illustrating a second embodiment of the invention.

Referring now to FIGS. 3-5 of the drawings there is shown by way of example a single-cable scanning apparatus incorporating the improved drive of the present invention. The drive is similar to the dual-cable arrangement, but only one end of carriages 11 and 12 is driven. Precision tape 21a is fixed to the carriage subassembly at point 24a which is adjusted at the factory to provide the proper optical path distance. This adjustment need never be disturbed for tape or cable replacement. The precision tape then engages running block pulley 26a at one end of the half-rate carriage 12 and attaches to full-rate carriage 11 at point 27a. Cable 20a is also attached to full-rate carriage 11 at point 28a. It then passes a quarter of the way around idler pulley 29a and is coiled around capstan 22. Capstan 22 is designed for rotational adjustment via slots 38 and screws 39. In order to prevent any slippage between cable 20a and capstan 22, cable 20a is fixed to the capstan at point 22a. The cable 20a then successively traverses a quarter of the way around idler pulley 31a, half-way around idler pulley 32a and engages running block pulley 33a at the end of half-rate carriage 12 before attaching by means of spring 34a to the carriage subassembly at point 36a.

Field replacement of a broken precision tape is simple, and requires no adjustment due to the interchangeability of the precision tapes. Replacement of a broken cable is also simple and requires no adjustment, since in this version the cable and tape do not control carriage parallelism.

While the invention has been particularly shown and described with reference to the preferred embodiments thereof, it will be understood by those skilled in the art that various changes in form and detail and in applying the concepts of the invention may be made without departing from the spirit or scope thereof.

We claim:

1. Photocopier scanning apparatus comprising:
   a pair of carriages, a first one of said carriages having running block pulleys at each end thereof;
   a pair of capstans;
   a pair of springs;
   a pair of cables, each of said cables attached to a different end of said second carriage, coiled around one of said capstans, engaging one of said running block pulleys at the corresponding end of said first carriage, and fastened by one of said springs to a stationary part of said photocopier;
   a pair of precision tapes, each of said tapes attached to a different end of said second carriage, engaging one of said running block pulleys at the corresponding end of said first carriage and fastened to a stationary part of said photocopier, said precision tapes requiring no adjustment to their length after installation and one of said capstans being adjustable to bring the two carriages into parallel alignment.

2. Photocopier scanning apparatus comprising:
- a pair of carriages, a first one of said carriages having running block pulleys at one end thereof;
- a capstan;
- a spring;
- a precision tape, said tape attached to one end of a second one of said carriages, engaging one of said running block pulleys at the corresponding end of said first carriage and fastened to a stationary part of said photocopier; and
- a cable for driving said carriages at one end thereof, said cable attached to one end of said second carriage, coiled around said capstan, and engaging one of said running block pulleys at the corresponding end of said first carriage, said cable and said tape requiring no adjustment to length after replacement.

* * * * *